United States Patent [19]

Christianson

[11] Patent Number: 4,848,807
[45] Date of Patent: Jul. 18, 1989

[54] LIP SEAL FITTING

[75] Inventor: Roger D. Christianson, Los Alamitos, Calif.

[73] Assignee: Aeroquip Corporation, Linair Division, Gardena, Calif.

[21] Appl. No.: 174,110

[22] Filed: Mar. 28, 1988

[51] Int. Cl.⁴ ............................................. F16L 19/00
[52] U.S. Cl. .................................. 285/110; 285/334.4; 285/917
[58] Field of Search ...................... 285/917, 110, 334.4

[56] References Cited

U.S. PATENT DOCUMENTS

| | | | |
|---|---|---|---|
| 789,541 | 5/1905 | Hoyes | 285/917 X |
| 3,083,989 | 4/1963 | Press | 285/917 X |
| 3,137,509 | 6/1964 | Kazienko | 285/917 X |
| 3,142,498 | 7/1964 | Press | 285/917 X |
| 3,672,704 | 6/1972 | Christianson | 285/110 |
| 3,891,246 | 6/1975 | Hopper | 285/917 X |
| 4,193,617 | 3/1980 | Hitz | 285/917 X |

*Primary Examiner*—Dave W. Arola
*Attorney, Agent, or Firm*—Keith D. Beecher

[57] ABSTRACT

A gas-tight end fitting for a tube, such as the type used in aircraft. The fitting has an internal annular groove extending partially into the fitting which forms an annular flange or beam, and the face of the beam and of the remaining portion of the fitting has a concave configuration of a single predetermined radius.

4 Claims, 1 Drawing Sheet

LIP SEAL FITTING

BACKGROUND OF THE INVENTION

The lip seal fitting of the present invention is of the same general type described in U.S. Pat. No. 3,672,704 which issued June 27, 1972 in the name of the present inventor.

The invention described in U.S. Pat. No. 3,672,704 involves a pair of end fittings. One fitting terminates at a seal in the form of a concave annular disc comprising a blend of several arcs. One of the arcs forms a heel constituting an annular bearing surface. Another of the arcs forms a cantilevered spring or deflecting beam having a toe constituting an annular sealing surface. The annular sealing surface is held tightly under a spring tension caused by a compression of the deflecting beam as the fitting is tightened.

Since the seal of the fitting described in U.S. Pat. No. 3,672,704 depends to a large extent upon spring tension concentrating forces at relatively narrow sealing surfaces, instead of upon a broad face-to-face metal deformation, less torque is required to make a metal-to-metal gas-tight seal with the fitting of U.S. Pat. No. 3,672,704 as compared with the prior art existing at that time.

Also, the fitting described in U.S. Pat. No. 3,672,704 enables the beam to be loosened and re-sealed many times without causing permanent deformation which often occurs in fittings of the prior art at that time. Another feature of the fitting described in U.S. Pat. No. 3,672,704 as compared with the prior art fittings, is that any increase in gas pressure inside the fitting additively acts upon the spring tension to increase the seal at the toe of the deflecting beam.

The fitting assembly of the present invention is constructed to incorporate the features and advantages of the fitting described in U.S. Pat. No. 3,672,704, but to be of a configuration which is simpler to construct, and one which is not susceptible to stress failure, for example, at the hinge point of the deflecting beam.

The assembly of the invention is constructed so that the face of the fitting, including the face of the annular sealing disc or beam, is concave and of a single predetermined radius, so as to have a single arc from the outer perimeter of the fitting to the inner perimeter or toe of the annular deflecting beam, with the outer and inner perimeters of the arc forming the seal points.

The configuration of the face of the fitting of the invention assures that it will bottom out at the outer perimeter, rather than at some intermediate point, as is the case of the fitting of U.S. Pat. No. 3,672,704. This assures minimum installation torque requirements for the fitting of the invention because the pressure point of the beam is always concentrated at the inner perimeter or toe of the deflecting beam.

Moreover, the fitting of the invention is constructed to minimize stress concentration at the hinge line between the deflecting beam and the remaining portion of the fitting by maximizing the single arc radius on the face of the fitting. This reduces the likelihood of fatigue cracks occurring at the hinge line as compared with the prior art assemblies.

Another feature of the fitting of the invention is that it is simpler and less expensive to make than the prior art fittings. This is because the face of the fitting is shaped as a single arc as compared with the blend of arcs described, for example, in U.S. Pat. No. 3,672,704.

DETAILED DESCRIPTION OF THE ILLUSTRATED EMBODIMENT

Figure 1:
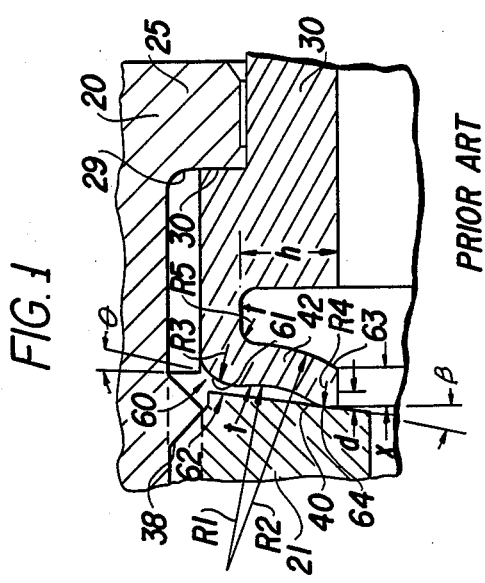
FIGS. 1 and 2 are schematic representations of the prior art fitting described in U.S. Pat. No. 3,672,704, showing the fitting respectively in a partly contacted position and in a closed and sealed position.
Figure 2:
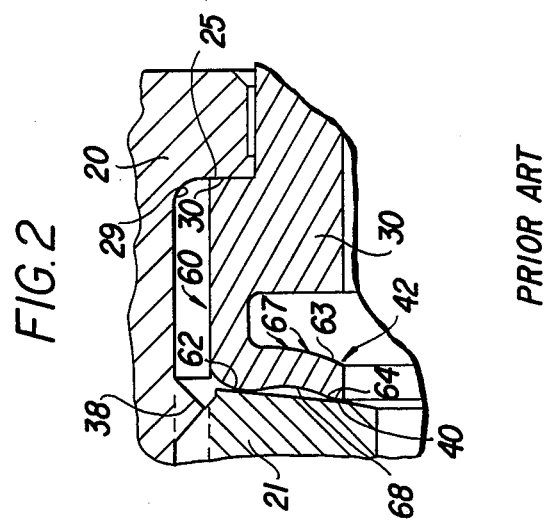

The prior art assembly shown in FIGS. 1 and 2 is a two-part end fitting which includes an internally threaded nut or socket 20 and an externally threaded nipple 21 which fit together in a mating configuration. To make an attachment, the outer threads of nipple 21 are inserted into the inner threads of the nut or socket 20, and the two members are turned in opposite directions until the nipple and socket come together in a gas-tight metal-to-metal sealing fit.

The nut or socket 20 comprises a tubular shell or nut with a shoulder 25 which fits over a metal sleeve or insert 30. The metal sleeve 30 has a stop rib 29 of a contour which is complementary to the contour of shoulder 25. As the two end fitting parts 20, 21 are turned relative to one another, an annular seat 40 approaches an annular sealing member 42 on the end of sleeve 30, the annular sealing member being in the form of a deflecting disc or beam formed by an internal annular groove in sleeve 30. When the end fittings reach the extremity of their travel, the annular seal 42 is compressed against the seat 40 in a gas-tight sealing engagement.

The prior art assembly of FIGS. 1 and 2 includes a fitting 60 having a concave annular flange. The flange is in the form of a concave deflecting beam having at least two arcs blended together in a smooth curve. One arc 61 of the cross-section forms a heel area which comes to rest at a single point 62 on seat 40 when the fitting has been tightened. This restricted contact area concentrates the sealing pressure in an annular ring, without requiring an excessive torque, since bearing friction is minimized. The second arc 63 in the cross-section of the deflecting beam provides an elastic arch resting on a toe area 64 which also forms an annular-shaped seal point concentrically positioned inside the seal point 62. As the fitting of FIGS. 1 and 2 is tightened, the beam deflects and a spring-bias presses down at toe point 64.

FIG. 2 shows the prior art fitting in a tightly closed position. As the socket 20 and nipple 21 are turned relative to one another and come together on threads 38, the shoulder 25 inside the socket presses against a similar shoulder on sleeve 30. The concave annular sealing flange on the sleeve 30 is pressed into a metal-to-metal gas-tight seal against seal 40. There is a seal at the two concentric annular points 62, 64. Any gas or fluid pressure (represented by arrows 67) inside the end fitting acts against the deflecting beam at 63 to press the seal together with even greater force. Thus there is a sealing pressure responsive to the compression of the end fitting flange caused by the travel in the threads 38; and there is also a sealing pressure responsive to the spring-like elasticity in the arch of the beam; and thirdly there is a sealing pressure from the gas pressure inside the fitting.

The object of the concavity of the arcuate surface of the prior art assembly shown in FIGS. 1 and 2 is to limit the amount of contact between the two end fittings which make up the assembly. The points of contact in the assembly are the extended lip 64 and a secondary contact seal and positive stop 62 near the outer perimeter. When the lip of the first fitting is deflected by the mating second fitting, it deflects in such a manner that the cross-section of the lip can be likened to the deflection curve of a cantilever beam. The effort is to assure that the loading force is concentrated on a single peripheral line at the edge of the lip while it is being deflected.

As stated above, the fitting of the present invention is similar in some respects to the fitting described in the Patent, and it exhibits all of the features of the fitting of the Patent. In addition, the fitting of the invention is simpler to construct than the fitting of the Patent, and has certain advantages including the elimination of stress failures at the hinge line of the deflecting beam.

Figure 3:
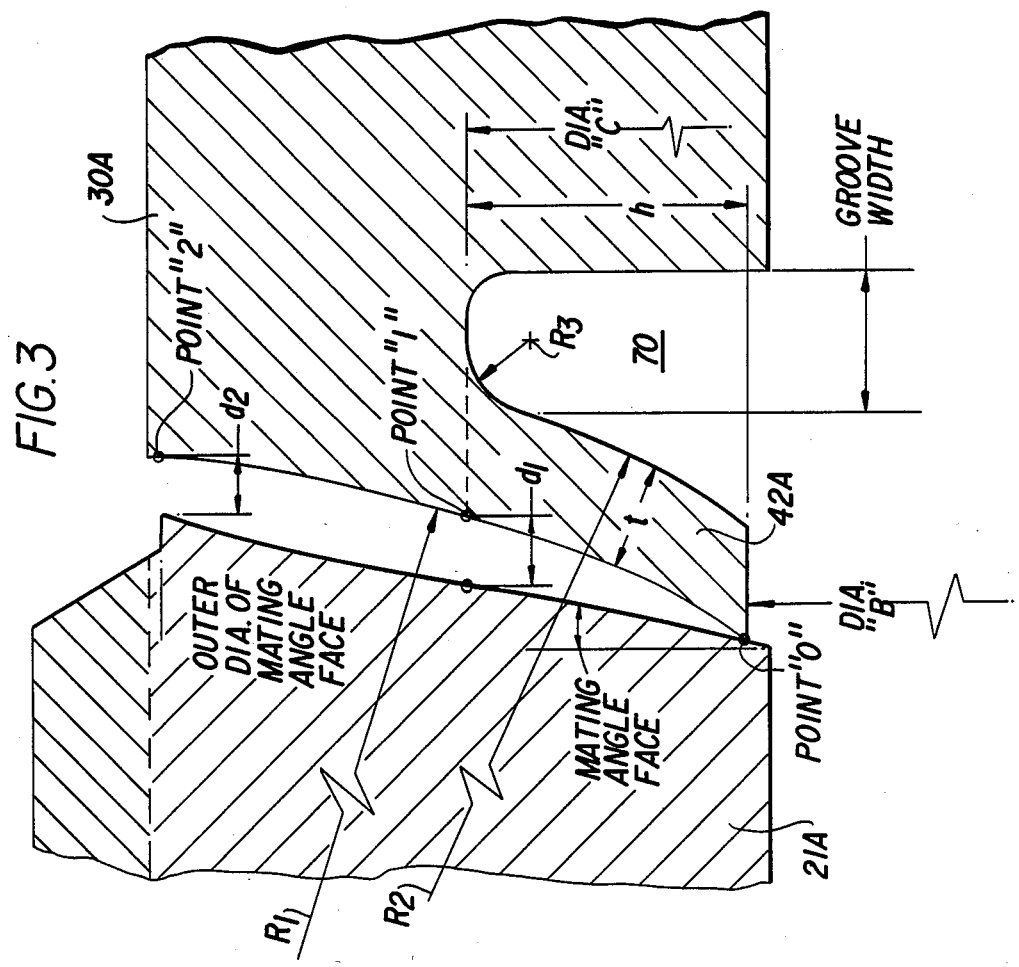
FIG. 3 is a schematic representation of a fitting representing one embodiment of the invention, with the fitting being shown in a partly contacted position.

A schematic representation of the fitting of the invention is shown in FIG. 3. The schematic representation of FIG. 3 shows a nipple 21A similar to the nipple 21 of FIGS. 1 and 2; and a sleeve 30A which is similar in some respects to the sleeve 30 of FIGS. 1 and 2, but which has a face configured in accordance with the concepts of the present invention.

Specifically, the sleeve 30A has an internal annular groove 20 which extends into the sleeve to a point designated Point "1" to have a height h. The forward face of the sleeve has an arcuate configuration of a single relatively large radius $R_1$, and Point "1" occurs at a point less than midway along the arc. The left-hand side of the annular groove 70 has an arcuate shape of a radius $R_2$ which is centered at the centerpoint of radius $R_1$, so that a deflecting beam or annular seal 42A is formed with its hinge line extending through Point "1"Z. An arc having a radius $R_3$ is formed at the upper left-hand corner of groove 70. The diameter of the groove is designated "C" in FIG. 3.

In the contacted position of FIG. 3, the toe of the deflecting beam 42A contacts the face of the nipple 21A at Point "0", as shown. At the same time, the perimeter of the sleeve 30A is displaced from the nipple 21A by a distance $d_2$ at Point "2". The Point "1" is then displaced from the face of the nipple by a distance $d_1$. The deflecting beam has a width or thickness t. The diameter of the toe of the deflecting beam is designated "B" in FIG. 3. Also, the face of the nipple 21A is angled to provide a mating angle with the face of sleeve 30A.

Accordingly, as the sleeve 30A is tightened against the nipple 21A in the assembly shown in FIG. 3, the only point of contact is Point "0" and the face of sleeve 30A has a single arcuate configuration from Point "0" to Point "2" to assure minimum installation torque requirements.

Also, the single arcuate configuration of the face of sleeve 30 with a relatively large radius $R_1$ assures that the two fittings will bottom at the outer perimeter Point "2", rather than at some intermediate point, as is the case with the fitting described in the patent. This, as stated above, assures minimum installation torque requirements because the pressure point of the beam is always concentrated at the inner perimeter Point "0".

Also, the configuration of the face of the deflecting beam 42a minimizes stress concentration at the hinge line at Point "1" between the deflecting beam 42A and the remaining portion of the sleeve. This reduces the likelihood of fatigue cracks occurring at the hinge line which is often the case in the prior art assemblies.

In addition, the fabrication costs are lower in the fitting of FIG. 3, as compared with the fitting of FIGS. 1 and 2, because a single arc is involved in the face of sleeve 30A, rather than the blended arcs of the fitting of FIGS. 1 and 2.

Specifically, the construction of FIG. 3 maximizes the radius $R_1$ and radius $R_2$ to provide minimum stress concentration at Point "1", so as to avoid fatigue cracks at that point which often occur in the prior art designs.

Also, the maximum $R_1$ radius and the sizing of the distances $D_1$ and $D_2$ assures bottoming at Point "2" at the perimeter of sleeve 30 rather than Point "1" at the hinge line, thereby assuring minimum installation torque requirements, because the pressure point on the deflecting beam 42A is always concentrated at Point "0" at the toe of the beam.

The design criteria of the fitting of FIG. 3 may be set out as follows:

1. The critical aspects of this design are the "X" coordinates of points "1" and "2".
2. $X_0=0$, $Y_0=B(\text{dia})/2$ $X_1=(F_1(h))$, $Y_1=C(\text{dia})/2$ $X_2=(F_2(h))$, $Y_2=$(outer diameter of mating angle face/2
3. $h=(C(\text{dia})-B(\text{dia}))/2$
4. $F_1=[(C_1)(\text{mating angle})+C_2]$ rounded .XXX
   $F_2=[(C_3)(\text{mating angle})+C_4]$ rounded .XXX
5. $C_1=$range from 0.01 to 0.02, normally at 0.0167
   $C_2=$range from 0.12 to 0.18, normally at 0.1486
   $C_3=$range from 0.03 to 0.04, normally at 0.03455
   $C_4=$range from 0.08 to 0.14, normally at 0.1077
6. $R_1=(X_1-X_0)/\{\cos\{90+\text{ATAN}[(Y_2-Y_0)/(X_2-X_0)]-\text{ATAN}[(Y_2-Y_1)/(X_2-X_1)]\}-\text{ATAN}[(Y_1-Y_0)/(X_1-X_0)]\}-\cos\{90+\text{ATAN}[(X_2-X_0)/(Y_2-Y_0)]-\text{ATAN}[(X_2-X_1)/(-Y_2-Y_1)]-\text{ATAN}[(Y_1-Y_0)/(X_1-X_0)]\}\}$
7. $R2=R1+t$
8. t is dependent on material strength and pressure normally in the range of 0.01 to 0.06
9. $R3=$full groove radius$=0.25(h)+0.007$ It will be appreciated that while a particular embodiment of the invention has been shown and described, modifications may be made. It is intended in the claims to cover all modifications which come within the true spirit and scope of the invention.

I claim:

1. An end fitting assembly for tubular members which have an internal fluid pressure, said fitting assembly comprising: a first tubular member; a second tubular member; each having an inner and outer perimeter, and means for securing the tubular members together in a fluid-tight seal; said first tubular member having a forward face with a concave arcuate configuration of a single radius, and having an internal annular groove therein extending from said inner perimeter into the first tubular member a predetermined distance corresponding to an intermediate point on said forward face, said groove and said forward face forming an annular deflecting beam with a hinge line extending through said intermediate point, said forward face of said first tubular member at said inner perimeter thereof defining an annular toe and being configured such that as the first and second tubular members are drawn together the annular toe of the deflecting beam first contacts the forward face of the second tubular member and the outer perimeter of the first tubular member is displaced from the forward face of the second tubular member by a predetermined distance, and a predetermined spacing is provided between the first and second tubular members over the entire interface thereof, and as the tubular members are tightened together the only point of contact is between said annular toe and said forward face of said second tubular member until the forward faces of the two tubular members bottom out at the outer perimeters thereof.

2. The end fitting assembly defined in claim 1, in which the forward face of said second tubular member is angled to provide a mating angle with the forward face of said first tubular member.

3. The end fitting assembly defined in claim 1, in which said intermediate point on said forward face is less than midway along the arc thereof from said annular toe of the deflecting beam.

4. The end fitting assembly defined in claim 1, in which the side of said annular groove adjacent said forward face has a convex arcuate configuration with a radius centered at the center point of said single radius of said forward face of said first tubular member.

* * * * *